United States Patent [19]

Zimmer et al.

[11] Patent Number: 5,390,391
[45] Date of Patent: Feb. 21, 1995

[54] WIPING DEVICE WITH VARIABLE CONTACT FORCE FOR WINDOWS OF MOTOR VEHICLES

[75] Inventors: Joachim Zimmer, Sasbach; Ralf Pohlers, Gaggenau; Andreas Geis, Bühl; Jan Dietrich, Bühl-Vimbuch, all of Germany

[73] Assignee: Robert Bosch GmbH, Stuttgart, Germany

[21] Appl. No.: 971,764

[22] PCT Filed: Jun. 26, 1991

[86] PCT No.: PCT/DE91/00520
§ 371 Date: Feb. 1, 1993
§ 102(e) Date: Feb. 1, 1993

[87] PCT Pub. No.: WO92/02391
PCT Pub. Date: Feb. 20, 1992

[30] Foreign Application Priority Data

Aug. 3, 1990 [DE] Germany .................. 4024702
Oct. 16, 1990 [DE] Germany .................. 4032762

[51] Int. Cl.6 ................................ B60S 1/32
[52] U.S. Cl. .................. 15/250.20; 15/250.34
[58] Field of Search ........... 15/250.20, 250.35, 250.34, 15/250.19, 250.21, 250.31, 250.23

[56] References Cited

U.S. PATENT DOCUMENTS 4,370,774  2/1993  Bienert et al. ............... 15/250.20
5,056,182 10/1991  Fukumoto et al. ........... 15/250.20

FOREIGN PATENT DOCUMENTS 252748   3/1967  Austria .
901051   5/1985  Belgium .
0382346  8/1990  European Pat. Off. .
1555256  6/1970  Germany .
2314724 10/1974  Germany .
3314456 10/1984  Germany .
61-71254  4/1986  Japan .
62-205843 9/1987  Japan .
1186449  7/1989  Japan .
240347   9/1989  Japan ........................ 15/250.23

Primary Examiner—Timothy F. Simone
Assistant Examiner—Gary K. Graham
Attorney, Agent, or Firm—Michael J. Striker

[57] ABSTRACT

A device is proposed, which serves for wiping windows of motor vehicles. The wiping device comprises a wiping blade which is moved in an oscillating manner over the window, is applied to the latter with a contact force and the wiping element of which tips into a drag position on each change of direction. A quick and quiet turning of the wiping element from its one into its other operating position is achieved when the contact force is smaller in the region of the two oscillation reversal positions than in the wiping field section lying between these regions.

14 Claims, 4 Drawing Sheets

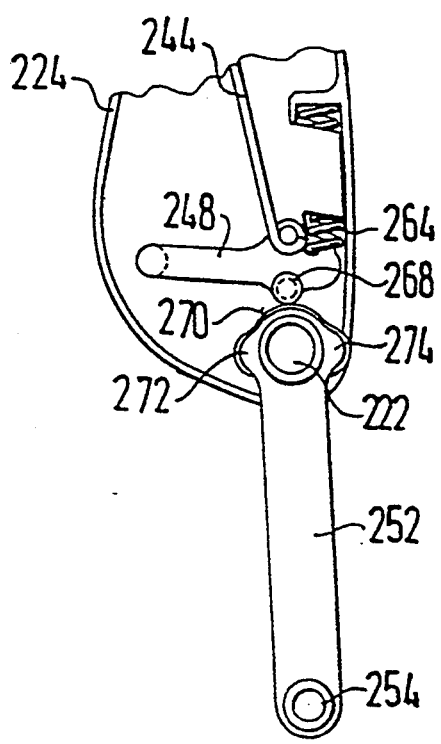
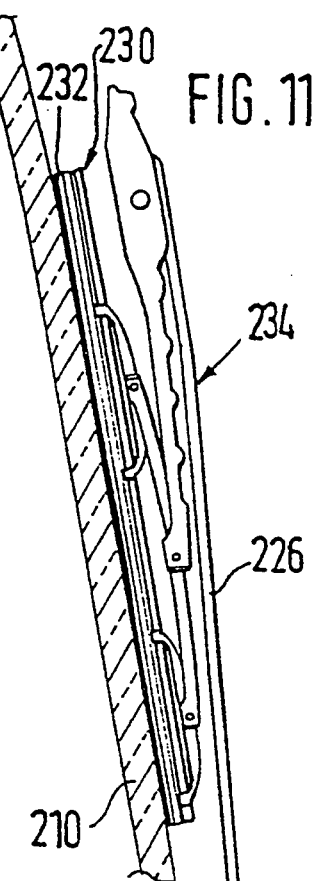
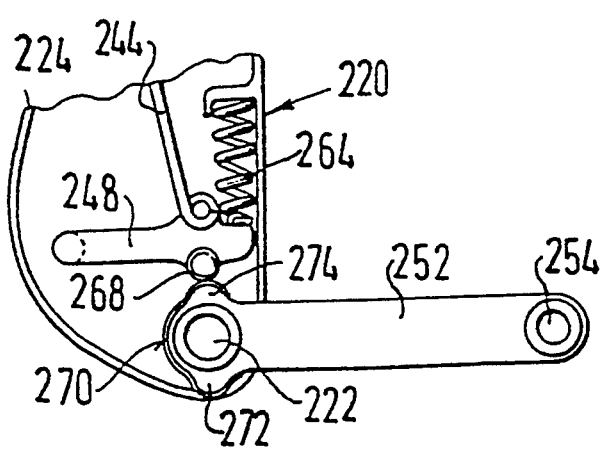
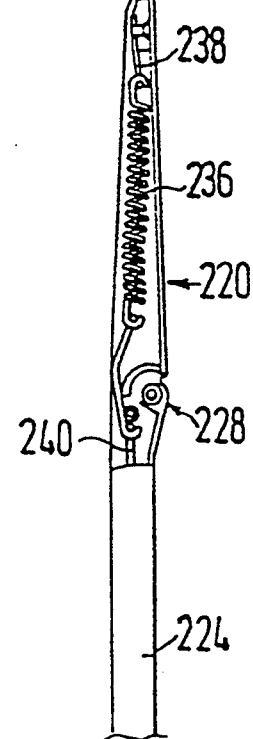

WIPING DEVICE WITH VARIABLE CONTACT FORCE FOR WINDOWS OF MOTOR VEHICLES

BACKGROUND OF THE INVENTION

The present invention relates to a wiping device for windows of motor vehicles.

More particularly, it relates to a wiping device which has a wiping blade movable in an oscillating manner over the window with a contact force applied to the latter, and provided with a wiping element tipping into a track position on each change of direction, a wiper shaft driven in an oscillating movement and connected to a wiping lever located with a hub part on the wiper shaft, and a pretensioning tension spring which brings about the contact force of the wiping blade.

A wiping device is already known (DE-OS 33 14 456), in which the contact force of the wiping blade on the window is modified depending upon the driving speed of the motor vehicle, so that, for example, the lifting-off tendency of the wiping blade, which occurs at high driving speeds, is counteracted. It is also intended for the wiping blade to be relieved in its parking position in order that a permanent deformation of the wiping rubber can be effectively countered.

SUMMARY OF THE INVENTION

Accordingly, it is an object of the present invention to provide a wiping device for windows of motor vehicles, which avoids the disadvantages of the prior art.

In keeping with these objects and with others which will become apparent hereinafter, one feature of the present invention resides, briefly stated, in a wiping device in which a two-armed lever is mounted oscillatably on a hub part of the wiping lever and having one lever arm holding one end of the tension spring and another lever arm interacting with the longitudinally displaceable tappet so that the tappet movable by control means in relation to the other lever arm pivots the lever and at the same time increases the spring tension, wherein the control means is formed by a cam track displaceable in direction of the tappet axis and at least partially surrounding an extension of an oscillation axis and by pick-off means which interact with the track and are arranged on a rocker connected in a rotationally fixed manner with the wiper shaft and extending transversely to the oscillation axis.

When the wiping device is designed in accordance with the present invention, it has on the other hand the advantage that, as a result of the reduced contact pressure in the oscillation reversal positions, a problem-free turning action of the wiping element is obtained and the necessary drag position is achieved quickly and quietly.

It can be considered a further advantage that the wiping blade contact pressure is reduced in the parking position also, so that the undesirable permanent deformation of the wiping rubber is at the same time avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 9 shows the four-joint lever linkage when the wiper arm is situated in a central oscillation operating position, FIG. 10 shows the four-joint lever linkage when the wiper arm is situated in its other oscillation reversal position and FIG. 11 shows a partial side view of a wiping lever consisting of wiper arm and wiping blade.

DESCRIPTION OF THE FIRST PREFERRED EMBODIMENT

Figure 1:
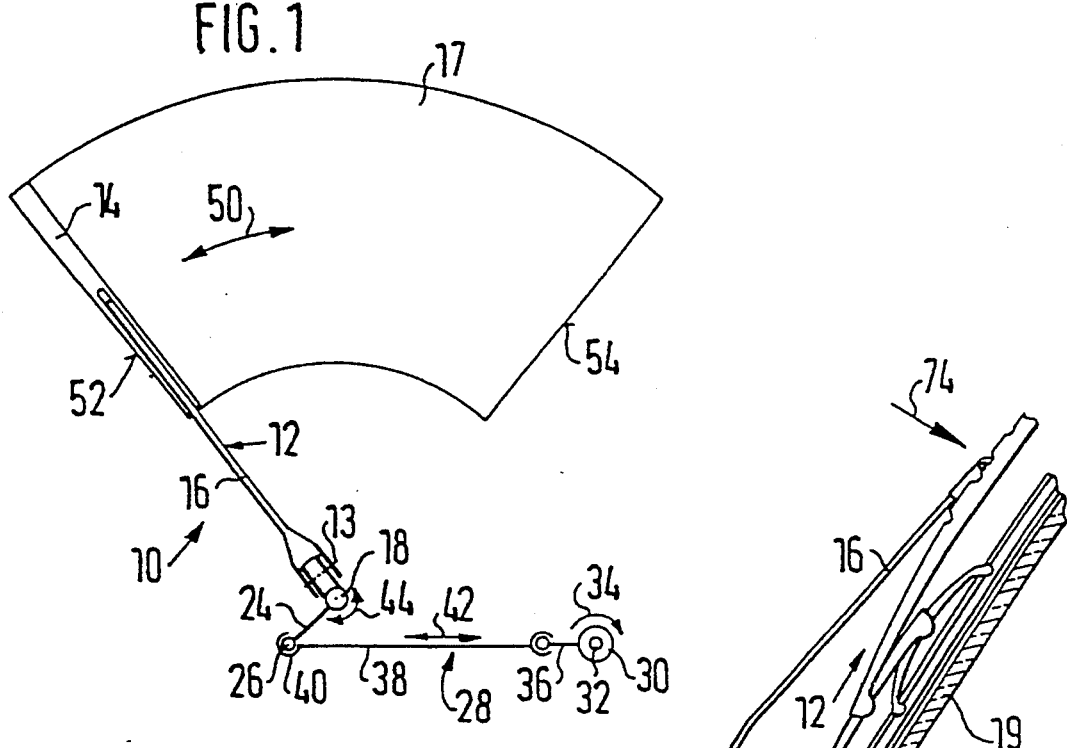
FIG. 1 shows a diagrammatic illustration of a first wiping device for the windscreen of a motor vehicle.
Figure 2:
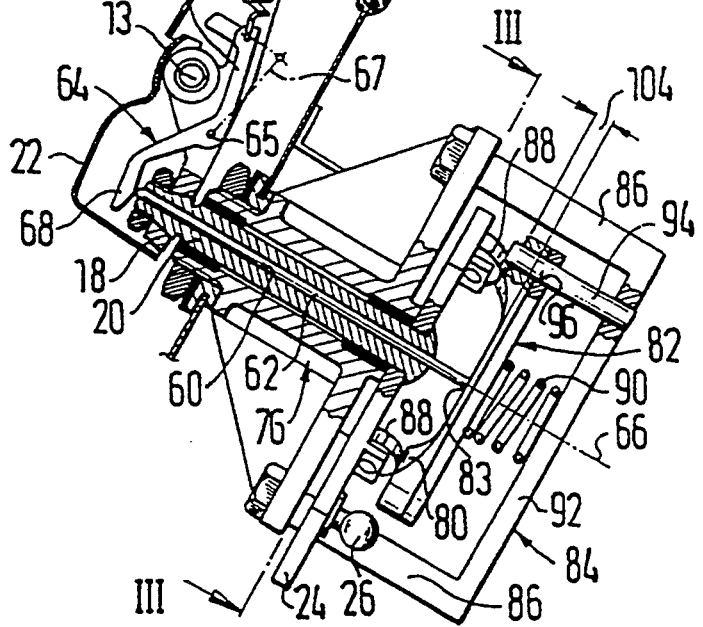
FIG. 2 shows an enlarged partially sectional illustration of the wiping device according to FIG. 1.
Figure 5:
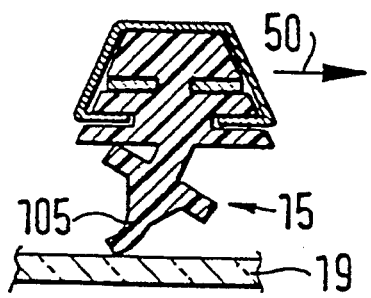
FIG. 5 shows the resulting cross-sectional area of a section along the line V—V in FIG. 2 in an enlarged illustration, the wiping element being situated in a first operating position.
Figure 6:
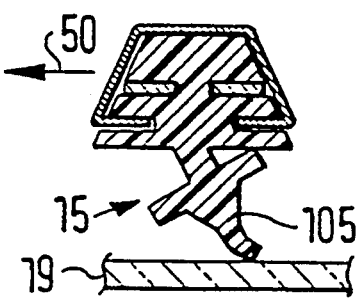
FIG. 6 shows the sectional area according to FIG. 5 with the wiping element situated in its other operating position.

FIG. 1 shows a wiping device 10 which has a wiping lever 12 which is driven in an oscillating manner. An elongate wiping blade 14, which bears on the window to be wiped and is articulated at the free end of a wiper arm 16, belong [sic] to the wiping lever 12. The wiper arm 16 is connected in an articulated manner to a hub part 18 which is in turn fastened on a wiper shaft 20 which is driven in an oscillating manner in its longitudinal axis. A covering cap 22 belonging to the wiping lever 12 covers the hub part 18 to a large extent. As FIG. 2 shows, the wiping lever 12 is connected to one end of the wiper shaft 20. Arranged in a rotationally fixed manner on the other end of the wiper shaft 20 is a rocker 24. The rocker 24 furthermore bears a ball pivot 26 which serves for connecting the oscillation linkage 28 (FIG. 1). The oscillation linkage has a drive aggregate 30, on the drive shaft 32 of which a crank 36 rotating in the direction of the arrow 34 is fastened. Articulated to the free end of the crank 36 is one end a [sic] push rod 38 and the other end of the push rod 38 engages with a joint socket 40 on the ball pivot 26 of the rocker 24 (FIG. 1). When the drive aggregate drives the crank 36 rotationally in the direction of the arrow 34, the push rod 38 is moved to and fro in the direction of the double arrow 42. This results in an oscillating movement (double arrow 44) which is transmitted from the rocker 24 to the wiper shaft 20 and from the latter to the wiping lever 12. An oscillation angle α thus results (FIG. 3), which is absolutely the same size both for the rocker 24 and for the wiping lever 12 or for the wiping blade 14. With the oscillating movement of the rocker 24, the wiping lever 12 also carries out an oscillating movement which is indicated with a double arrow 50 in FIG. 1. The wiping blade 14 then sweeps with a wiping element 15 over a wiping field on the window 19, which field has been indicated with 17 in FIG. 1. In operation, the wiping blade 14 or the wiping lever 12 runs from its operating position illustrated in FIG. 1 into its first reversal position 52, where it reverses its direction of movement and runs back into its other reversal position 54. In order that the window to be wiped is properly cleaned and quiet running of the wiping element 15 on the window 19 is guaranteed, it always tips into a so-called drag position. In FIG. 5, the operating or drag position is illustrated, in which the wiping element 15 is situated when it runs out of its reversal position 52 into the other reversal position 54. FIG. 6, on the other hand, shows the other drag position which results when the wiping blade 14 runs out of its reversal position 54 into the other reversal position 52. The respective directions of movement are indicated in both FIGS. 5 and 6 with arrows which correspond to the double arrow 50 in FIG. 1 and have thus likewise been indicated with 50.

As FIG. 2 also shows, the wiper shaft 20 is provided with a longitudinal bore 60, in which a tappet 62 is mounted, which projects from the wiper shaft 20 on both sides. Furthermore, a lever 64 is mounted oscillatably on the hub part 18. The lever 64 is designed as a two-armed lever. Its oscillation axis 65 lies transversely to the extent of the oscillation axis 66 of the wiper shaft 20. The oscillation axis 66 is identical with the longitudinal axis of the tappet 62 in the illustrated embodiment of the invention. The first lever arm 68 of the lever 64 bears on one end front face of the tappet 62. Anchored on the other lever arm 70 of the lever 64 is one end of a tension spring 72, the other end of which engages on the wiper arm 16. The tension spring 72 is pretensioned in the position illustrated in FIG. 2. The arrangement of the spring 72 and of the lever 64 in relation to the joint 13 between hub part and wiper arm is effected in such a manner that the spring 72 loads the wiper arm in the direction of the arrow 74 and consequently holds the wiping blade with its wiping element 15 applied against the window 19 to be wiped. As FIG. 1 shows, the axis of the joint 13 extends essentially in the direction of wiping (double arrow 50). It consequently also lies in a plane which can be designated the wiping plane. The mounting of the wiper shaft 20 takes place in a bearing block 76 fixed to the body.

Figure 3:
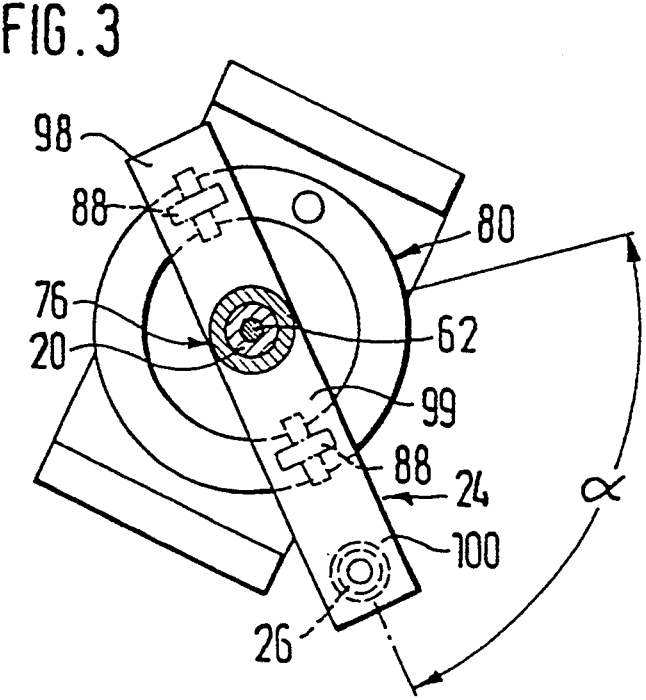
FIG. 3 shows a section through the wiping device according to FIG. 2 along the line III—III.

The wiping device described thus far is known from the state of the art indicated in the introduction according to German Offenlegungsschrift 33 14 456, to which reference is expressly made here and the disclosure of which consequently becomes the disclosure of the present application for patent rights. In particular the remarks made on page 7, paragraph 2 and page 8, paragraphs 1 and 2 are of special significance here since there, in association with FIGS. 2 and 3, the relationships between tappet displacement and application force of the tension spring have been illustrated and explained in detail. By longitudinal displacement of the tappet 62, the pretensioning of the tension spring 72 can be influenced. In the operating position illustrated in FIG. 2, the tension spring 72 is only slightly pretensioned. The contact pressure of the wiping element 15 on the window 19 is thus minimal. If, however, the tappet 62 is displaced in such a manner that its end facing the lever arm 68 protrudes further from the wiper shaft 20 than is indicated in FIG. 2, the lever arm 68 pivots anticlockwise about the bearing point 65 of the lever 64, the other lever arm 70 of the lever 64 passing into a position which has been indicated in dot/-dash lines and with 67 in FIG. 2. In this operating position, the tension spring 72 is clearly more greatly tensioned than in the operating position already described. As a result, the pressure force (arrow 74), with which the wiping element 15 bears on the window 19 to be wiped, is also clearly increased. For the longitudinal displacement of the tappet 62, the wiping device is according to FIG. 2 provided with control means which include a cam track 80. The cam track 80 is arranged on one front face of a disc-shaped component 82 arranged essentially coaxially with the oscillation axis 66. The disc-shaped component 82 is overlapped by a U-shaped frame 84, the two free ends of the U-legs 86 of which are rigidly connected to the bearing block 76. The cam track 80 is situated on the front face of the component 82 which faces the wiper shaft 20 or the rocker 24. On the side of the rocker 24 which faces the cam track 80, two rollers 88 are mounted, which lie on the same part-circle in relation to the oscillation axis 66. The cam track 80 surrounds at least for the most part the oscillation axis 66. It is, as FIG. 3 shows, of annular design and dimensioned and arranged in such a manner that the rollers 88 run cleanly on the cam track 80 when, during operation of the wiping device, the rocker 24 oscillates over an angle which is designated with $\alpha$ in FIG. 3. In order that the cam track 80 always remains in contact with the rollers 88, a pretensioned pressure spring 90 is provided, which is supported on the two mutually facing faces of the component 82 and of the U-base 92. Furthermore, anchored in the U-base 92 is a guide pivot 94 which extends in a bore 96 of the component 82 and forms a torsional safety arrangement for this component 82. The rocker 24 has two mutually opposite rocker arms 98, 99 which lie transversely to the oscillation axis 66 and on which in each case one of the two rollers 88 is arranged. The rocker arm 99 has an extension 100 (FIG. 3), on which the ball pin 26 is located. The two rollers 88, together with the cam track 80, form control means, by means of which a displacement of the tappet 62 in the axial direction is achieved.

Figure 4:
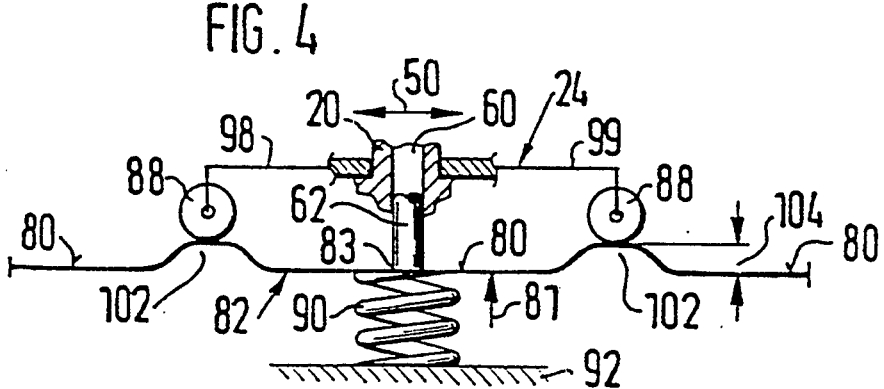
FIG. 4 shows a diagrammatically illustrated developed view of a cam track belonging to the wiping device, with pick-off rollers assigned to this cam track.

This is explained below with reference to the diagrammatic illustration according to FIG. 4. It is clear that the oscillating movement 50 must there be illustrated as rectilinear movement, because the cam track 80 is likewise illustrated in a rectilinear manner. In this connection, the distance between the two cams 102 corresponds to the oscillation angle $\alpha$. The cam track 80 is there drawn in a divided and extended manner. The arrangement of the two rocker arms 98 and 99 and of the rollers 88 arranged thereon is also illustrated only diagrammatically. As FIG. 4 further shows, the pressure spring 90 is supported on the U-base 92 of the frame 84. In this connection, it presses the cam track 80 in the direction of the arrow 81 firmly against the rollers 88 and thus against the rocker 24 which in turn is connected rigidly to the tube-like wiper shaft 20. As is also indicated in FIG. 4, the tappet 62 is guided displaceably in the bore 60 of the wiper shaft 20. Lastly, it can be seen from FIG. 4 that the cam track has two cams 102 which are raised out of the remaining track by an amount 104, each cam being assigned one of the rollers 88. According to FIG. 4, the two rollers 88, which serve as pick-off means for the shape of the cam track 80, are situated on the highest region of the cams 102. In this position, the wiping element 15 or the wiping blade 14 is situated in its one reversal position. As can be seen from FIG. 2, the tappet 62 is in this connection pressed against the central region of the component 82 by the lever arm 68 which is loaded slightly in the anti-clockwise direction. This central region of the component 82 serves as pressure piece 83, on which the end of the tappet 62 facing away from the lever 64 always comes to bear. When the wiping device is switched on and the wiping blade 14 is moved out of its in [sic] reversal position 54 in the direction of the arrow 50 (FIG. 6), the wiping element 15 will first still bear with minimal pressure force on the window 19, because the tension spring 72 is situated in the position shown in FIG. 2, in which it is relatively relieved. The tension present is just sufficient in order to prevent clattering of the wiping lever 12 in relation to the window 19 and to apply the tappet 62 to the component 82. A wiping lip 105 belonging to the wiping element then tips, at the beginning of the oscillating movement, immediately and without creating noise into its correct drag position illustrated in FIG. 6. When the wiping blade has reached its other reversal position 52 (FIG. 1), the two rollers 88 are again situated on the cams 102 so that the wiping element 15 is again relieved to the maximum. With the reversal of the oscillation direction, the wiping lip 105 can then again turn over without problems into its other drag position (FIG. 5). In the region of the wiping field 17 lying between the two reversal positions 54 and 52, however, the rollers 88 pass into the recessed regions of the cam track 80. In this connection, the cam track 80 or the entire component 82 is displaced by an amount 104 (FIGS. 2 and 4) in the direction of the oscillation axis 66 towards the rocker 24, the rollers 88 always remaining in contact with the cam track 80, because the pressure spring 90 ensures this contact. In this connection, the tappet 62 is of course also displaced above the central region of the component 82 by the amount 104, so that the tappet 62 protrudes further from the wiper shaft 20 with its end facing away from the cam track 80 and turns the lever 64 in the clockwise direction about the pivoting axis 65. In this connection, the tension spring 72 passes into its position designated with 67, the spring 72 being tensioned and the pressure force 74 increased. It is consequently clear that, with the movement of the component 82 or the cam track 80 in the direction of the oscillation axis 66 by the amount 104, the tension of the spring 72 is always reduced when the wiping blade 14 is situated in the region of the reversal positions 52, 54 or when the wiping blade approaches these oscillation reversal positions. In the two oscillation reversal positions 52 and 54 themselves, both rollers 88 are always situated on the highest regions of the two cams 102. In this manner, the contact force in the region of the two oscillation reversal positions 52, 54 is always reduced in relation to the contact force which arises in the wiping field section created between the two reversal positions. It can further be seen from the above that the change in the contact force of the wiping blade 14 on the window 19 is derived from the oscillating movement (arrow 50) of the window wiper.

DESCRIPTION OF THE SECOND EXEMPLARY EMBODIMENT

Figure 7:
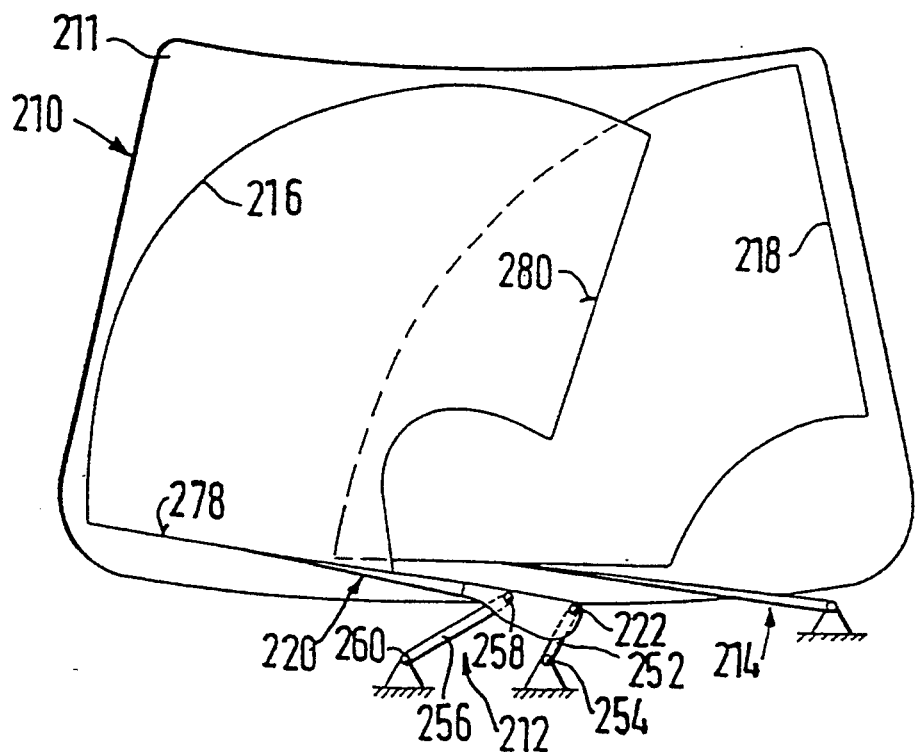
FIG. 7 shows a basic illustration of a motor vehicle windscreen with a second wiping device with two wiper arms, one wiper arm of which is driven via a four-joint lever linkage.
Figure 8:
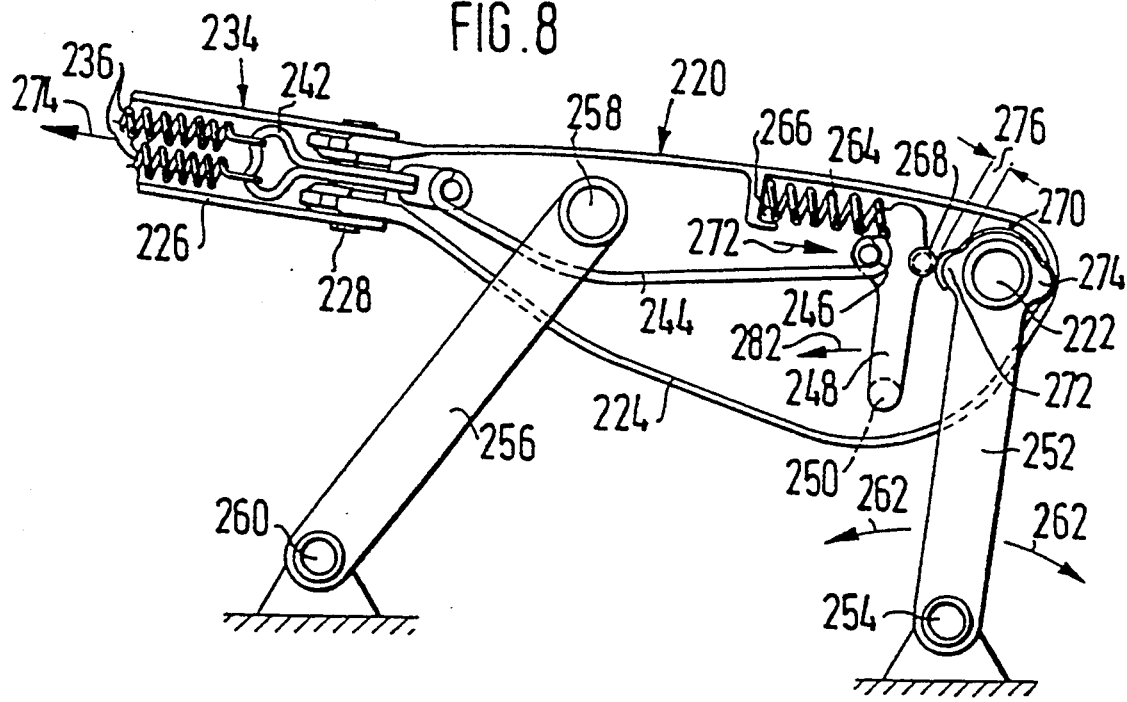
FIG. 8 shows an enlarged illustration of the four-joint lever linkage seen from the direction of the window to be wiped, in the one reversal or parking position of the wiper arm depicted in FIG. 7.

The windscreen 210 of a motor vehicle illustrated in FIG. 7 has two wiping devices 212, 214 which in each case work a wiping field 216 or 218. The wiping field 218 worked by the window-wiping device 214 is of essentially circular segment-shaped design. The window-wiping device 212 on the other hand sweeps over a wiping field 216, the form of which deviates from the circular segment shape. The window-wiping device 212 is the subject of the embodiments following now. The window-wiping device 212 is a so-called oscillating wiping device with a wiper arm 220, the oscillating movement of which takes place about the axis of a joint 222. The wiper arm 220 is made in two parts in the exemplary embodiment. It has a joint piece 224 (FIG. 8), on which a wiper rod 226 is articulated. This articulation is effected in a joint 228, the joint axis of which extends in a plane which is essentially parallel to a plane, in which the spherically curved windscreen 210 extends. Arranged on the end of the wiper rod 226 facing away from the wiper arm joint 228 is a wiping blade 230 (FIG. 11) which is applied with a wiping lip 232 to the surface of the window 210 to be cleaned. The window-wiping device 212 consequently has a wiping lever 234, to which the wiper arm 220 and the wiping blade 230 belong. Furthermore, the wiper arm 220 is equipped with spring means 236 which in the exemplary embodiment are designed as two tension springs lying next to one another (FIG. 8). The tension springs 236 bridge in their longitudinal extent the wiper arm joint 228; this means that in each case there is a wiper rod-side anchoring 238 and a joint piece-side anchoring 240 for the tension springs 236. In the exemplary embodiment, transmission means 242 and a transmission bow 244 belonging to these, which is fixed with an end hook 246 on a lever 248, also belong to the tension springs 236. The lever 248 is in turn mounted pivotably on the joint piece 224 via a transverse pivot 250. The joint pieceside anchoring of the tension springs 246 is thus effected on the lever 248. Articulated in the joint 222 on the joint piece 224 is one end of a rocker 252 which is driven in an oscillating manner. The other end of the rocker 252 has a joint 254 which is fixed to the frame. Furthermore, one end of a link rod 256 is held in a joint 258 on the joint piece 224, while the other end of the link rod 256 is guided in a joint 260 fixed to the frame. A four-joint arrangement consequently results, with two joints 254 and 260 fixed to the frame, the driven rocker being mounted in the joint 254 and the link rod 256 being mounted in the joint 260 fixed to the frame. The two other joints 258 and 222 are arranged on the joint piece 224 of the wiper arm 220 which consequently forms the coupling rod of the four-joint arrangement. In this connection, the axis of the joints 222, 258, 260 and the oscillation axis of the rocker 252 lie at least approximately parallel to one another in the joint 254. Therefore, when the rocker 252 oscillates in the direction of the arrows 262 (FIG. 8), the link rod 256 forces an oscillating movement of the wiper arm about the joint 222. As, however, the joint 222 itself carries out an oscillating movement (arrows 262), the wiping blade 230 bearing on the window 210 describes a path which produces a wiping field 216 which deviates from a circular segment. The wiping field thus extends further into the corner region 211 of the windscreen 210 than would be possible in the case of a wiping field of circular segment shape. As can further be seen from FIG. 8, arranged on the free end of the lever 248, which faces away from the transverse pivot 250, is a pressure spring 264 which is supported on the one hand in a pretensioned manner on a shoulder 284 of the lever 248 and on the other hand on a counter-shoulder 266 of the joint piece 224. This pressure spring 264 ensures that the lever 248 bears with a sliding roller 268 on a curved track 270 which is designed on the end region of the rocker 252 having the joint 222. The curved track 270 has a central region which extends over a given angle concentrically about the oscillation axis of the joint 222. Both end regions of the curved track 270 become cam-like projections 272 and 274, the effective camheight of which is provided with the reference number 276 in FIG. 8.

In operation, the window-wiping device 212 works in the following manner:

As already explained with reference to FIG. 8, the window device 212 is driven via the rocker 252. In this connection, the joint 222 describes a path which runs concentrically with the axis of the joint 254. During this oscillating movement of the rocker 252, the link rod 256 forces an oscillating movement of the wiper arm 220 about the Joint 222 (FIGS. 8 to 10). A further oscillating movement of the wiper arm 220 is thus superimposed on the oscillating movement of the joint 222. During the oscillating movement of the wiper arm 220 about the axis of the Joint 222, the lever 248 bears with its sliding roller 268 always on the curved track 270. This presupposes, of course, that the force (arrow 272) exerted by the pressure spring 264 on the lever 248 is greater than the tensioning force (arrow 274) of the two tension springs 236. The result of this is that the actual anchoring of the tension springs 236 on the joint piece 224 is effected by the sliding roller 268 on the curved track 70 [sic]. In the operating position of the window-wiping device 212 shown in FIG. 8, the wiping lever 234 is situated in the reversal or parking position 278 illustrated in FIG. 7 and pivots in the clockwise direction into its other oscillation reversal position 280. The position of the wiper arm 220 in relation to the rocker 252, which results in this oscillation reversal position 280, is illustrated in FIG. 10. The operating position shown in FIG. 9 illustrates a central operating position which comes about approximately halfway between the two oscillation reversal positions 278 and 280. It can consequently be seen that, in the two oscillation reversal positions (FIGS. 8 and 10), the sliding roller 268 of the lever 248 is in each case situated on the apex of one of the cams 272 and 274 respectively. There consequently results, in the region of the two reversal positions of the wiping lever 234, a deflection of the lever 248 in the direction of the arrow 282 illustrated in FIG. 8 and specifically by the amount which results from the effective cam height 276. As the two tension springs 236 ensure a proper pressure force of the wiping blade 230 on the surface of the window 210 to be wiped, because, with their transmission means 242, they bridge the joint 228 in the region between the window and this Joint 228, this pressure force directed towards the window 210 is reduced in the region of the two oscillation reversal positions. As a result, a problem-free and quiet turning of a wiping lip present on the wiping blade 232 is achieved, which lip must always tip into a so-called drag position in order that the generally known and undesirable clattering of the wiping blade 230 on the window 210 is avoided. Furthermore, the wiping blade 230 is also relieved in its parking position 278, which is particularly advantageous when the window-wiping device 212 is stopped for a relatively long period of time at high temperatures. In order to achieve the relief of the tension springs 236 in the region of the wiping lever reversal positions 278, 280, the relative movement of the wiper arm 220 in relation to the rocker 252 is therefore utilised.

It will be understood that each of the elements described above, or two or more together, may also find a useful application in other types of constructions differing from the types described above.

While the invention has been illustrated and described as embodied in a wiping device for windows of motor vehicles, it is not intended to be limited to the details shown since various modifications and structural changes may be made without departing in any way from the spirit or the present invention.

Without further analysis, the foregoing will so fully reveal the gist of the present invention that others can, by applying current knowledge, readily adapt it for various applications without omitting features that, from the standpoint of the prior art, fairly constitutes essential characteristics of the generic or specific aspects of this invention.

What is claimed as new and desired to be protected by Letters Patent is set forth in the appended claims.

We claim:

1. A wiping device for windows of motor vehicles, comprising a wiping blade which is movable in an oscillating manner over a window in a wiping field section lying between two oscillating reversal positions, said blade contacting the window with a contact force which is smaller in a region of said two oscillating reversal positions than in the region of said wiping field lying between said oscillation reversal positions; an elongated wiper shaft having a hub part, and driven in an oscillating manner about an oscillation axis by driving means; a wiping lever fastened to one end of said wiper shaft through said hub part, said wiping lever having a wiper arm supporting said wiping blade, said wiper lever and said hub part being connected with one another at a joint axis lying in a plane extending between said hub part and said wiper lever; a pretensioned elongated tension spring bringing about the contact force of said wiping blade, said tension spring having one end engaging on said hub part and another end anchored on said wiper arm; a two-armed lever pivotally mounted on said hub part and having one lever arm holding said one end of said tension spring and another lever arm engaging with one end of an elongated, longitudinally displaceable tappet such that movement of said tappet pivots said two-armed lever to cause increases and decreases in a tension of said spring; and control means which moves said tappet along its longitudinal axis, said control means are formed by a cam track which is displaceable along said longitudinal axis and by pick-off means engaging with said cam track for controlling a displacement of said cam track in the direction along said longitudinal axis, said pick-off means are mounted on a rocker which is connected to said wiper shaft and extends transversely to said oscillation axis.

2. A wiping device as defined in claim 1, wherein said wiping blade has a flexible wiping element which tips into a drag position during movement of said wiping blade in an oscillating manner over the window.

3. A wiping device as defined in claim 1, wherein said wiper shaft has a longitudinal bore, said tappet being guided in said longitudinal bore of said wiper shaft.

4. A wiping device as defined in claim 1, wherein said pick-off means are formed by rollers abutting against said cam track.

5. A wiping device as defined in claim 1, wherein said cam track includes a pressure piece which bears on the opposite end of said tappet.

6. A wiping device as defined in claim 1, wherein said cam track is spring-loaded against said tappet.

7. A wiping device as defined in claim 1, wherein said cam track is rotationally secured relative to said oscillation axis.

8. A wiping device as defined in claim 1; and further comprising a disc-shaped component arranged coaxially with said oscillation axis and having a front and rear face, said cam track being situated on said front face of said disc-shaped component; a U-shaped frame overlapping said disc-shaped component, said frame being fixed and having a U-shaped base situated at a distance from said component facing said rear face; and a pretensioned pressure spring coupled between said rear face and said base.

9. A wiping device as defined in claim 8, wherein said U-base has a bore and said component has a recess; and further comprising a guide pin received in said bore of said U-base and extending parallel to said oscillating axis so as to engage in said recess of said component.

10. A wiping device as defined in claim 8, wherein said rocker is fastened on an end of said wiper shaft which faces said component, said pick-off means being formed as rollers which are mounted on said rocker in facing relation to said cam track and abutting against said cam track.

11. A wiping device as defined in claim 10, wherein said cam track has two cams, said rocker having two mutually opposite rocker arms located transversely to said oscillating axis and each supporting a roller, each of said rollers being assigned to a respective one of said cams of said cam track.

12. A wiping device as defined in claim 11, wherein one of said rocker arms of said rocker is provided with an extension which extends away from said oscillation axis and has a ball pin; and further comprising an oscillating linkage connected with said ball pin and said driving means.

13. A wiping device as defined in claim 11, wherein said cams are formed so that said rollers run onto said cams when said wiping blade approaches one of said two oscillation reversal positions.

14. A wiping device as defined in claim 13, wherein said cams have highest regions, said rollers being situated on said highest regions of said cams when said wiping blade is in one of said two oscillation reversing positions.

* * * * *